United States Patent [19]

Shikama et al.

[11] Patent Number: 4,811,329

[45] Date of Patent: Mar. 7, 1989

[54] OPTICAL HEAD WITH LASER HAVING PARTICULAR SOURCE OF DRIVING CURRENT

[75] Inventors: Shinsuke Shikama; Eiichi Toide; Mitsushige Kondo, all of Nagaokakyo, Japan

[73] Assignee: Mitsubishi Denki Kabushiki Kaisha, Tokyo, Japan

[21] Appl. No.: 58,879

[22] Filed: Jun. 5, 1987

[30] Foreign Application Priority Data

Jun. 6, 1986 [JP] Japan .............................. 61-131236
Jun. 20, 1986 [JP] Japan .............................. 61-144038

[51] Int. Cl.$^4$ ................................................ G11B 7/00
[52] U.S. Cl. ....................................... 369/116; 369/121; 369/122
[58] Field of Search ............... 369/124, 121, 122, 116, 369/43–47; 358/342; 346/762

[56] References Cited

U.S. PATENT DOCUMENTS 4,345,321 8/1982 Arquie et al. .................... 369/122 X Primary Examiner—Robert L. Richardson
Attorney, Agent, or Firm—Oblon, Fisher, Spivak, McClelland & Maier

[57] ABSTRACT

An optical type head device comprises a laser beam source for emitting a laser beam, a light focussing means for converging the laser beam on a data storing surface of an optical type data storing medium, a laser beam detecting means which receives the laser beam reflected by the optical type data storing medium and modulated by data held by the same, and converts the data into electric signals, a driving current supplying means for supplying a driving current to the laser beam source. The driving current supplying means comprises a high frequency current generator which supplys to the laser beam source a high frequency current having a waveform ranging from the lower part of the threshold value at which the laser beam source starts emission of the laser beam to the higher part of the thresheld value, and the frequency of the high frequency current is at least twice as high as the maximum frequency component of information which is contained in the data storing medium.

11 Claims, 11 Drawing Sheets

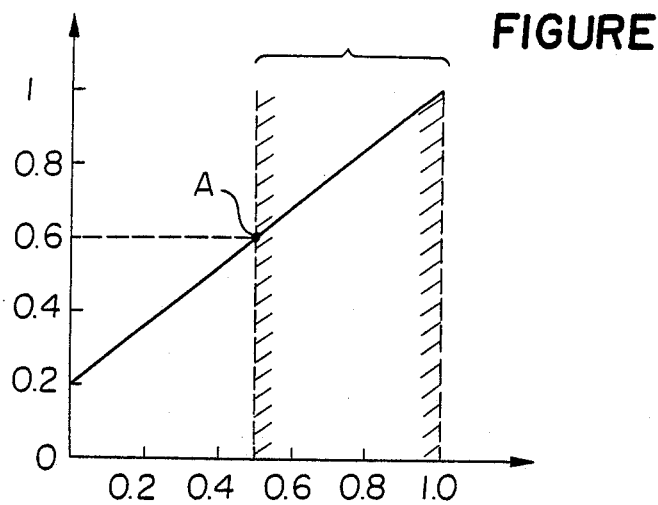
FIGURE 3
FIGURE 4
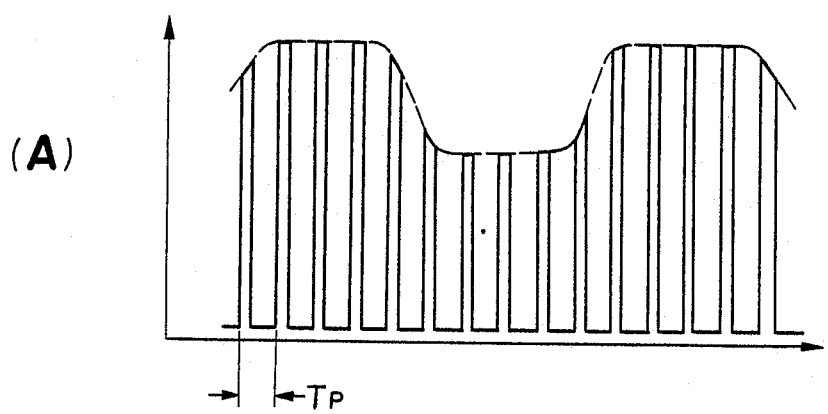
(A)
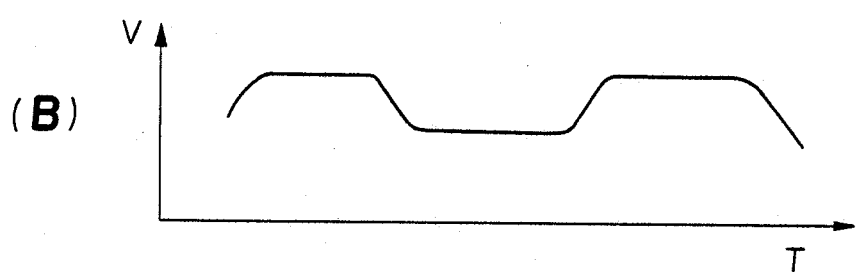
(B)

OPTICAL HEAD WITH LASER HAVING PARTICULAR SOURCE OF DRIVING CURRENT

BACKGROUND OF THE INVENTION

1. Field of the Invention

The present invention relates to an optical type head device. More particularly, it relates to an improvement in a driving current supplying means for feeding an electric current to a semiconductor laser beam source in the optical type head device.

2. Discussion of Background

There is well known an optical type head device for reading data stored on an optical type data storing medium such as an optical disc on which surface pits are formed, by supplying a laser beam and by detecting the laser beam reflected by the optical disc. Such optical type head device is used for various electric devices and appliances such as an audio PCM disc player, a video disc player and so on.

FIG. 14 shows general construction of a conventional optical type head device. The device comprises a semiconductor laser beam source 1 (hereinbelow referred to as a light source) emitting a laser beam, a beam splitter 2 for separating the emitted laser beam from the reflected laser beam, the beam splitter 2 being formed by a prism having a half-mirror portion, and a condensor lens 3 which constitutes a light converging means.

In the rear of the laser beam source 1, provided is a light detector 4 as a laser beam intensity detecting and photoelectrically converting means which outputs an electric current in proportion to the intensity of the laser beam emitted from the laser beam source 1 and which is connected to a driving power source 5 as a driving current supplying means so that an electric current is supplied to the laser beam source 1. Also, an optical disc 6 is provided at a position where the laser beam i converged by means of the condensor lens 3. A motor-driven shaft 7 is fitted in an opening at the center of the optical disc 6 so that it is rotated by a motor.

Further, a leser beam detector 9 is provided at a position where the laser beam reflected by the data storing surface 8 of the optical disc 6 is converged.

The laser beam detector 9 outputs an electric signal to a pre-amplifier 10 in which the electric current signal is converted into an electric voltage which is processed in a circuit (not shown) to be utilized for an electric device such as an audio or a video device or a digital player and so on.

The operation of the optical type head device having the above-mentioned construction will be described.

A driving current is supplied to the leaser beam source 1 by the driving power source 5 and the laser beam source 1 emitts a laser beam to the beam splitter 2. At the same time, light 12 in proportion to the intensity of the emitted laser beam 11 is generated backwardly from the laser beam source 1. The light 12 is detected by the monitoring light detector 4 which in turn, generates an electric current in proportion to the intensity of the emitted laser beam 11 to the driving power source 5 as a feedback signal. Namely, the laser beam source 1, the light detector 4 and the driving power source 5 constitute a negative feedback control loop so that a constant laser beam output can be obtained even when there is change in characteristics of the emitted laser beam to an input current.

The laser beam 11 is passed through the beam splitter 2 and is focussed on the data storing surface 8 of the optical disc 6 by means of the condensor lens. Since the data storing surface 8 has a number of pits, the laser beam focussed on the optical disc is modulated by recorded data and is reflected to the condensor lens 3. The reflected laser beam passes through the lens 3 and changes its path to the laser beam detector 9 by means of the beam splitter 2.

The laser beam detector 9 outputs an electric current depending on the intensity of the reflected laser beam 13. The electric current signal is converted into a voltage signal by a pre-amplifier 10 to be outputted from a terminal 14.

As the optical disc 6 is rotated by the shaft 7, the data on the optical disc 6 are succesively reproduced and outputted from the terminal.

The optical type head device has usually a focussing servo means for correcting focussing error of the laser beam on the optical disc and a tracking servo means for correcting deviation in the light spot of the laser beam to a data track on the optical disc although these means are omitted in the drawings.

FIG. 5 illustrates operational characteristics of the laser beam source in a relation of driving current I to the power of the emitted laser beam.

As apparent from FIG. 15, the I-P characteristics of the laser beam source 1 is in a non-linear form in which inclination of the characteristic line suddenly increses when the driving current I exceeds the threshold value Ith. Namely, the region of I>Ith is a "laser oscillation region" and the region of 0<I<Ith is a "spontaneous emission region" in which there is no oscillation of a laser beam.

In the above-mentioned optical type head device, a coherent laser beam is converged on the optical disc to read the data on the optical disc. In this case, the driving current of the laser beam source which contributes reading of the data is only in the region of I>Ith which causes laser beam oscillation.

On the other hand, an operating power $P_{DC}$ is typically 3 mW (Watts) in the case of the optical type head device having the I-P characteristics shown in FIG. 15. In this case, the driving current $I_{DC}$ is 40 mA (Amperes) and the threshold current Ith is 30 mA. Accordingly, when the laser beam source is to be driven by supplying 40 mA of the driving current $I_{DC}$, only an electric current of $I_{DC}$−Ith=10 A is utilized as the current to produce the laser beam necessary to operate the optical type head device.

When I>Ith, change in the voltage across the PN junction (forward operating voltage) of the laser beam source is extremely small in the maximum rated current range, which can be regarded as being practically constant. Specifically, a voltage value is 1.8 V (Volts) in a device having the characteristics shown in FIG. 15.

In the conventional optical type head device, a d.c. current having a constant value is used to drive the laser beam source. As described before, since the I-P characteristics is in a non-linear form, a proportion of the threshold current Ith to the driving current $I_{DC}$ is large, whereby a large driving power is required to operate the laser beam source. The large driving power increases temperature at the PN junction of the laser beam source to thereby shorten the lifetime of it. There is another problem that the lifetime of a battery is shortened when it is installed in an electric device such as a portable type CD player.

SUMMARY OF THE INVENTION

It is an object of the present invention to provide an optical type head device which reduces a driving power from a laser beam source without deterioration of the reproduction characteristics and extends the lifetime of the laser beam source while saving consumption power.

The foregoing and the other objects of the present invention have been attained by providing an optical type head device comprising a laser beam source for emitting a laser beam, a light focussing means for converging the laser beam on a data storing surface of an optical type data storing medium, a laser beam detecting means which receives the laser beam reflected by the optical type data storing medium and modulated by data held by the same, and converts the data into electric signals, a driving current supplying means for supplying a driving current to the laser beam source, wherein the driving current supplying means comprises a high frequency current generator which supplys to the laser beam source a high frequency current having a waveform ranging from the lower part of the threshold value at which the laser beam source starts emission of the laser beam to the higher part of the threshold value, and the frequency of the high frequency current is at least twice as high as the maximum frequency component of information which is contained in the data storing medium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a diagram showing reduction of consumption power in the head device of the first embodiment;

FIGS. 4 (A) and (B) diagram are showing operation of reading data on an optical disc;

DETAILED DESCRIPTION OF PREFERRED EMBODIMENTS

Several preferred embodiments of the optical type head device according to the present invention will be described with reference to the drawings.

Figure 1:
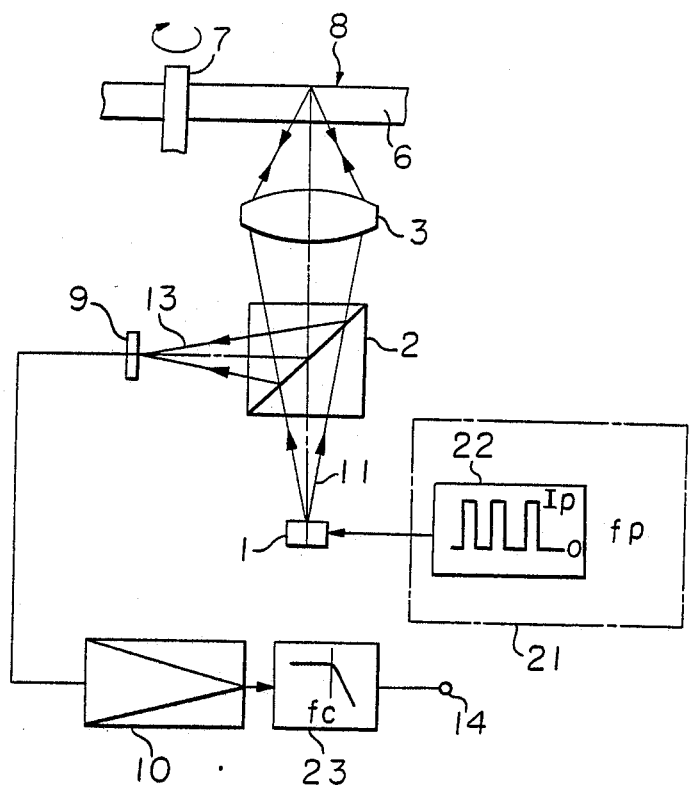
FIG. 1 is a diagram showing a first embodiment of the optical type head device according to the present invention.

FIG. 1 shows a general construction of the optical type head device according to the first embodiment of the designate the same or corresponding parts, and therefore, description of these parts is omitted.

A driving current supplying means 21 electrically connected to the laser beam source 1 comprises a high frequency current oscillator 22 which produces a high frequency current whose amplitude spans a current region which covers the threshold value at which the laser beam source starts laser oscillation and a current region which is lower than the threshold value. A low-pass filter 23 is connected to the output side of the pre-amplifier 10.

The operation of the optical type head device of the first embodiment will be described.

The high frequency current generator 22 of the current supplying means 21 outputs a high frequency current having a frequency fp to the laser beam source 1. The high frequency current is a series of pulses in a rectangular form having a duty ratio of 0.5 which raise and fall between zero and $I_P$ ($I_P > I_{th}$).

Figure 2:
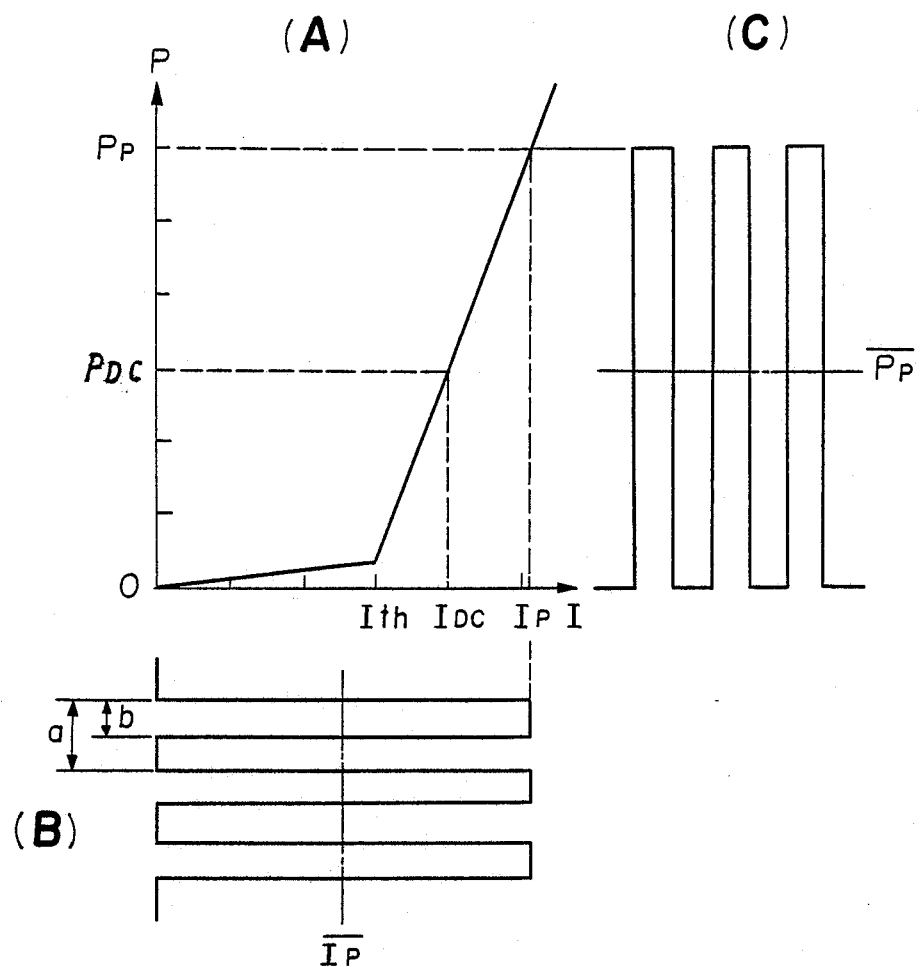
FIGS. 2 (A) through (C) is a diagram showing the function of the head device of the first embodiment.

FIG. 2 illustrates the function of the laser beam source 1.

FIG. 2A shows I-P characteristics of the laser beam source 1; FIG. 2B shows the waveform of the driving current for the laser beam source 1, and FIG. 2C shows the waveform of a power P for emitting the laser beam.

In more detail, when the driving current shown in FIG. 2B is supplied to the laser beam source 1, the laser beam is emitted from the laser beam source 1 in which the laser beam is in the rectangular waveform having a power P, a frequency fp and a duty ratio of 0.5, and in which the laser beam emission power changes from zero to $P_P$. In FIG. 2, $I_{DC}$ and $P_{DC}$ respectively refer to a d.c. driving current having a constant value and the power of the laser beam in the conventional optical type head device. When the duty ratio of the pulse current is 0.5, the average value of the power of the laser beam is one half of the peak power $P_p$. Accordingly, by selecting a peak current $I_P$ to satisfy a relation of $P_P = 2P_{DC}$, a relation of $\overline{P}_P = P_{DC}$ is obtainable, whereby the average power of the pulsed laser beam $\overline{P}_P$ is in coincidence with the driving power $P_{DC}$ as if the constant current is supplied.

In the following, consideration is made as to an average driving current $\overline{I}_P$ in a state that the average power of the light beam $\overline{P}_P$ is made in agreement with the driving power $P_{DC}$ by the constant current.

As shown in FIG. 2, when the duty ratio is 0.5, the average driving current $\overline{I}_P$ is one-half of $I_p$. In consideration of the non-linear I-P characteristics, when $I_p > I_{th}$, a relation $\overline{I}_P < I_{DC}$ is always established. Thus, the phenomenon that the average current $\overline{I}_P$ is smaller than $I_{DC}$ may be obtained as long as the laser beam source is not broken due to the peak current $I_P$ ever though the duty ratio is not 0.5.

The phenomenon as described above can be understood as follows.

In an ON period during which the driving current $I_P$ in a pulse form is supplied to the laser beam source 1, the rate of $I_P$ to Ith is remarkably lower than the rate of $I_{DC}$ to Ith. Accordingly, there is formed increase of a proportion of the current usuable for laser oscillation for the total amount of the current to be supplied to the laser beam source. Namely, in the conventional device, a current component of Ith with respect to the driving current $I_{DC}$ does not contribute to the laser oscillation. However, in the present invention, a current component of a factor of $(1-DR)$ can be reduced (where DR referred to a value of the duty in the waveform of the driving current and it is expressed by b/a in FIG. 2B).

In FIG. 2, driving current dependency of a forward voltage of the laser beam source is extremely small in the region of I>Ith and it can be considered to be substantially constant. Accordingly, a ratio of an average power for the laser beam source 1 is $I_{DC} \cdot I_P$ when the laser beam source 1 is driven by the pulse current.

Figure 15:
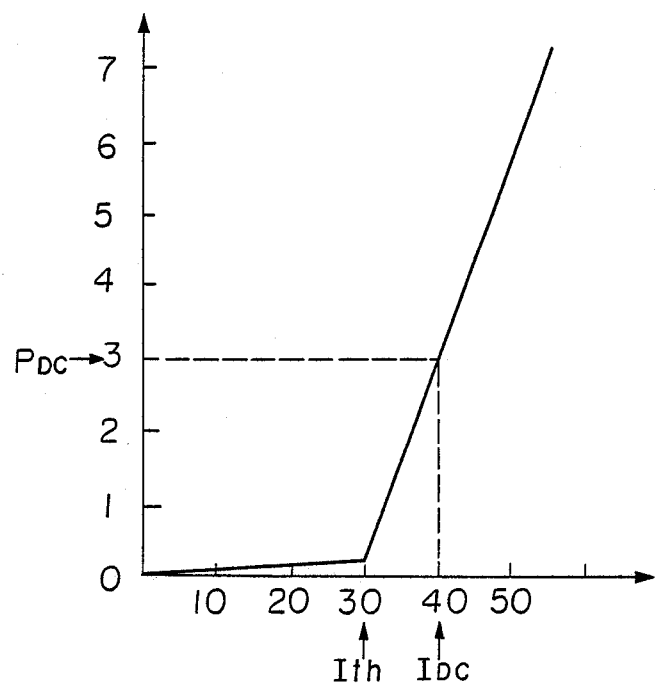
FIG. 15 is a diagram showing operational characteristics of the conventional device.

FIG. 3 is a diagram which shows that an average power can be reduced in the I-P characteristics shown in FIG. 15. In FIG. 15, laser beam emission power $P_{DC}$ is 3 mW, and the I-P characteristics are approximately defined by two linear lines connected at Ith.

In FIG. 3, when the laser beam source is actuated by the pulse current, a power of 6 mW is permissible for the peak power $P_P$. A range of the duty ratio to provide the peak power $P_P$ is 0.5-1.0, the area being hatched in FIG. 3. Accordingly, it is understandable that 40% reduction in the driving power can be attained by utilizing the pulse duty ratio at the point A in the above-mentioned range.

The peak power allowable for the laser beam source is variable depending on the nature of laser beam sources to be used. Also, the range of 0.5-1.0 of the duty ratio which has been mentioned to be desirable is for an example, and if there is a laser beam which permits a greater peak power $P_P$, a smaller duty ratio can be selected.

The operation for reading the data of the optical type head device in which the pulse-current-driven laser beam source 1 is used will be described.

The laser beam 11 emitted from the laser beam source 1 is passed through the beam splitter 2 and is converged on the data storing surface 8 of the optical disc 6 through the condensor lens 3. The laser beam is reflected by the data storing surface 8 and is retuned to the beam splitter 2 through the lens 3. The laser beam is reflected by the beam splitter 2 to be received in the laser beam detector 9. The laser beam is modulated by the data recorded on the optical disc 6 which is rotated by the rotating shaft 7, and the modulated laser beam is subjected to photoelectric conversion by the detector 9, and thus detected output is entered in the pre-amplifier. As shown in FIG. 4A, the output of the pre-amplifier 10 is a pulse form which is sampled with a time interval which is determined by a repetition frequency fp of the pulse, and a chain line obtained by connecting each peak of the pulse constitutes information of the data to be read.

The low-pass filter 23 has a cut-off frequency fc (fc<fp) to take out data components as indicated by the chain line. Accordingly, a reproduced output as shown in FIG. 4B is obtainable from the output terminal 14. The amplitude of the output can be considered to be the same as the reproduced output obtained by feeding the constant electric current if the average laser beam output is equal to the case of the constant electric current.

When the maximum frequency of the data recorded in the optical disc is fi, the frequency fp of the laser beam in the pulse form must be at least 2fi from the "sampling theory".

The inventors of the present application conducted experiments to read out the data by feeding a pulse current by using a compact disc as a optical disc.

The frequency fp of the pulse current was determined to be 19 MHz and the output of the pre-amplifier 10 was observed. It was found that a signal of 19 MHz was overlapped in a saw-toothed form on a reproduced waveform (the maximum frequency was about 720 KHz) of a compact disc.

A primary low-pass filter (fc=6.8 MHz) was inserted as the low-pass filter 23. As a result, a reproduced waveform substantially equal to that obtained when the constant current is supplied, was observed.

The low-pass filter 23 are not necessarily separated from the pre-amplifier 10. If the upper limit of the frequency band of the pre-amplifier is low to sufficiently remove pulse components of the frequency fp, it is unnecessary to insert the low-pass filter 23.

As described before, fp can be selected to have a relation of $fp \geq 2fi$ by the sampling theory. However, when the band of the pre-amplifier is to be limited by a low-pass filter having a phase distortion, phase distortion of the reproduced signal takes place at the vicinity of a cut-off frequency fc. In this case, an excellent reproduction characteristic may not be obtained when fp is determined to be nearly 2fi. Accordingly, it is desirable to select fp to have relation of $fp \geq 3fi$ to obtain an excellent reproduction characteristics when the band description is required by using an easy way such as the primary low-pass filter consisting of CR except that a perfect low-pass filter free from the phase distortion is used.

Figure 5:
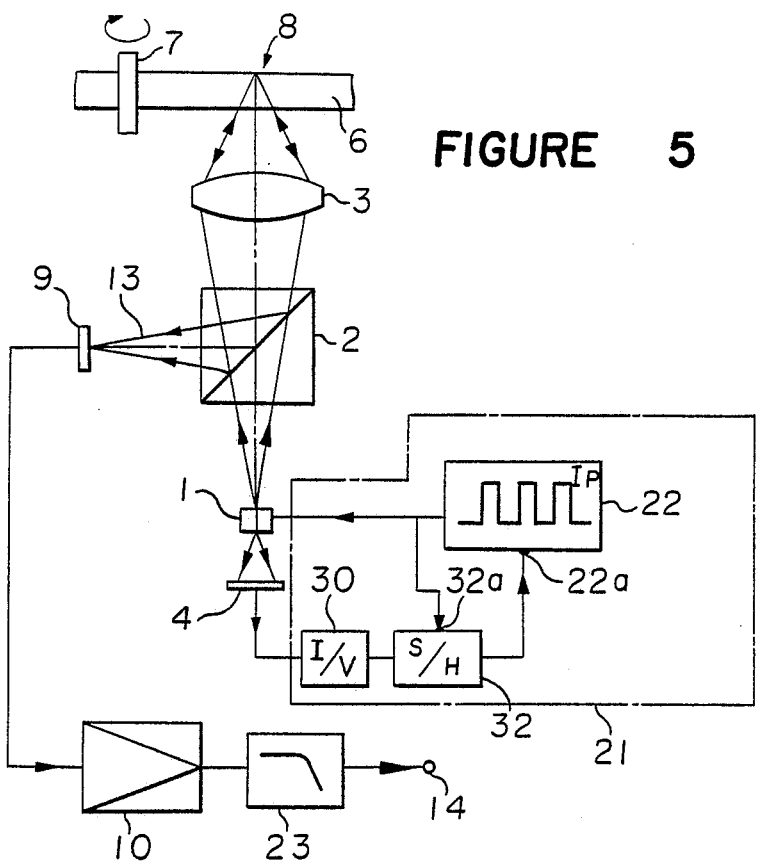
FIG. 5 is a diagram showing a second embodiment of the optical type head device according to the present invention.

In the following, a second embodiment of the optical type head device of the present invention will be described with reference to FIG. 5.

In contrast with the first embodiment in which the driving current supplying means 21 having the high frequency current generator 22 is connected to the laser beam source 1 to supply the pulse current, the second embodiment is so adapted that the peak power of the laser beam source 1 is made constant by the current supplying means 21. Namely, the current supplying means 21 of the second embodiment comprises a high frequency current generator 22 having an input terminal 22a for controlling the amplitude of the pulse current, a light detector 4 for monitoring the intensity of the laser beam emitted from the laser beam source 1, an I/V transducer 30 for converting an output current from the light detector 4 into an electric voltage, and a sample-hold circuit for detecting a peak output from the I/V transducer 30, i.e. the most intense point of the output of the pulse-modulated laser beam from the laser beam, by an input signal inputted in a sampling-instruction-signal input terminal 32a so as to be in synchronism with the output of the high frequency current generator 22. Accordingly, a power for actuating the laser beam source is controlled by a control loop shown in FIG. 5, so that the peak value of the output of the laser beam is stabilized.

According to the above-mentioned embodiments, the peak intensity of the pulse laser beam can be kept constant even when there is change in ambient temperature and the I-P characteristics of the laser beam source. It is also possible to avoid a short lifetime of the laser beam source due to increase in the peak value of the pulse current or reduction of the amplitude of a reproduced signal due to reduction of the peak value.

Figure 6:
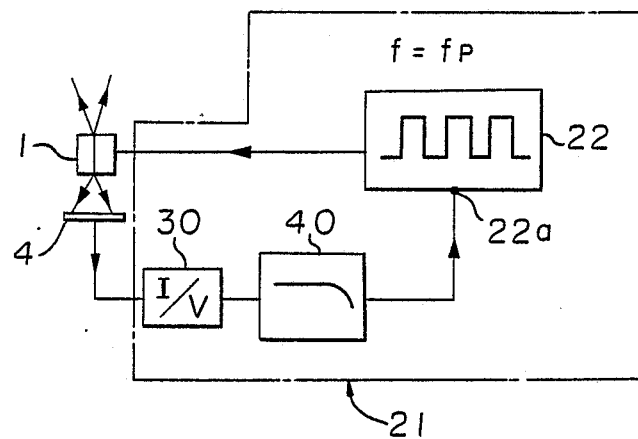
FIG. 6 is a diagram showing a driving current supplying means used for a third embodiment of the optical type head device according to the present invention.

FIG. 6 shows a diagram of the driving current supplying circuit 21 of the optical type head device according to the third embodiment of the present invention.

The third embodiment is so constructed that an output of the light detector 4 is subjected to I/V conversion and thus obtained voltage signal is inputted in a low-pass filter 40 so that the output of the low-pass filter is supplied for negative feedback to an amplitude controlling input terminal 22a. The low-pass filter 40 has a cut-off frequency which is sufficiently lower than the frequency fp of the pulse current from the high frequency current generator 22 so as to average the output from the I/V transducer.

Since the average output power from the low-pass filter 40 has a co-relation with the peak power of the laser beam source 1, the peak power is kept constant by the above-mentioned control loop.

The third embodiment has an advantage of more simplified construction in comparison with the second embodiment in which the peak power itself is sampled and is used as a feedback signal.

Figure 7:
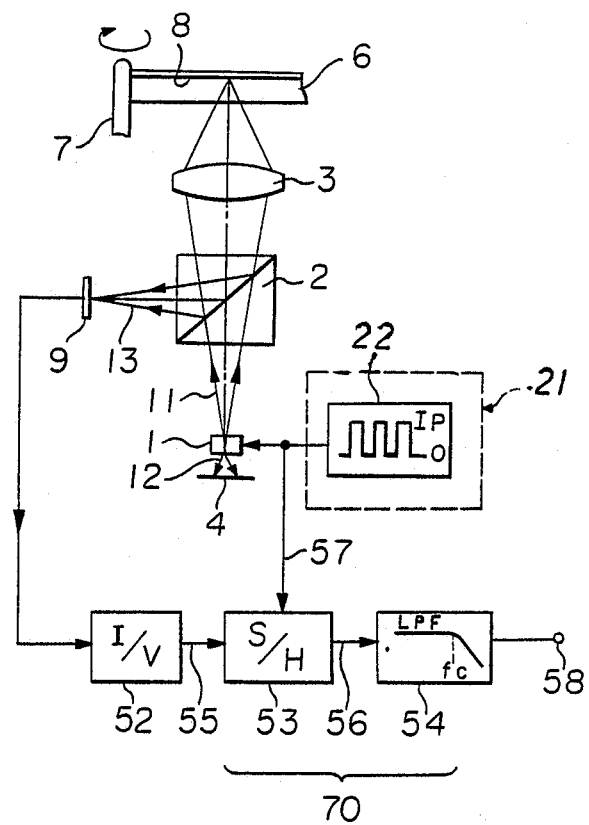
FIG. 7 is a diagram showing a fourth embodiment of the optical type head device according to the present invention.

FIG. 7 is a diagram showing a fourth embodiment of the optical type head device according to the present invention. In FIG. 7, the same reference numerals as in FIG. 1 designate the same or corresponding parts, and therefore, only parts different from those of the first embodiment will be described.

A reference numeral 60 designates a driving unit in which a high frequency pulse signal generator 50 is installed to supply a pulse signal having a predetermined high frequency to the laser beam source 1.

The laser beam detector 9 outputs an electric current signal having the intensity depending on the laser beam 13 reflected by the data storing surface 8. The output current is subjected to I/V conversion in the preamplifier 52; and then, are passed through a sample-hold circuit 53 and a low-pass filter 54, and is finally outputted from an output terminal 58. The sample-hold circuit 53 and the low-pass filter 54 constitute a demodulating means 70. Thus, an electrically reproduced signal is outputted as a form of voltage function of the data stored in the data storing surface 8 of the optical disc 6.

In the fourth embodiment, the light detector 10 for monitoring the intensity of the laser beam emitted from the laser beam source 1 is not utilized. The fourth embodiment includes the focussing servo and tracking servo systems which are similar to or the same as the first embodiment. But, they are also omitted in the drawings. In the optical type head device shown in FIG. 7, a laser beam source actuating device 21 is provided with a high frequency pulse oscillator 22 so that a driving current having a high frequency is supplied to the laser beam source 1. The demodulating means 70 is provided between the pre-amplifier 52 and the output terminal 58. The output signal 55 of the pre-amplifier 52 is sampled by the sample-hold circuit 53 so as to be in synchronism with the frequency of the high frequency current 57 which is supplied from the laser beam source actuating device 21 to the laser beam source 1. The output 56 of the sample-hold circuit 53 is smoothed by the low-pass filter 54 to thereby remove frequency components of the sampled signal, and the output of the low-pass filter 54 is outputted from the output terminal 58. Thus, the readable data containing in the optical signal received by the laser beam detector 9 are detected in synchronism with the frequency of the high frequency current 57 from the laser beam source actuating device 21.

The operation of the fourth embodiment of the optical type head device will be described.

Figure 8:
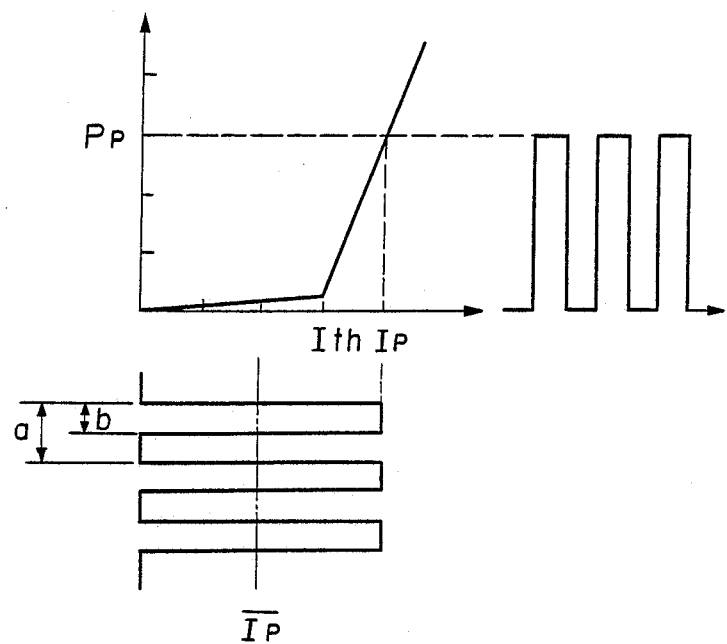
FIG. 8 is a diagram showing operational characteristics of the optical type head device of the present invention.

FIG. 8 shows at its lower portion a waveform of the driving circuit I outputted from the laser beam source actuating device 21 shown in FIG. 7. The laser beam source actuating device 21 outputs a high frequency current having a rectangular waveform with a repetition frequency of fp and a duty of $D_R$ ($D_R=b/a$) which spans the regions between zero curmet (I=0) and a peak current Ip whch is grater than the threshold current Ith. The driving current I is supplied to the laser beam source.

The waveform illustrated in the right part of FIG. 8 is a waveform of the laser beam power P from the laser beam source 1 when it is actuated by the driving current I. The laser beam power is a pulse form having a rectangular waveform having the same repetition frequency fp and duty $D_R$ as those of the driving current I. Namely, the laser beam power p of the laser beam source is modulated by the high frequency power of the driving current I so as to cause oscillation between the zero power (P=0) and the peak power (P=Pp) In this case, the magnitude of the peak current $I_P$ is determined to have the same magnitude as the constant current $I_{DC}$ obtained when the laser beam source is actuated by a d.c. current. Thus, the laser beam power $P_{DC}$ having the same level as that when the laser beam source is actuated by the constant d.c. current $I_{DC}$ is outputted.

Figure 9:
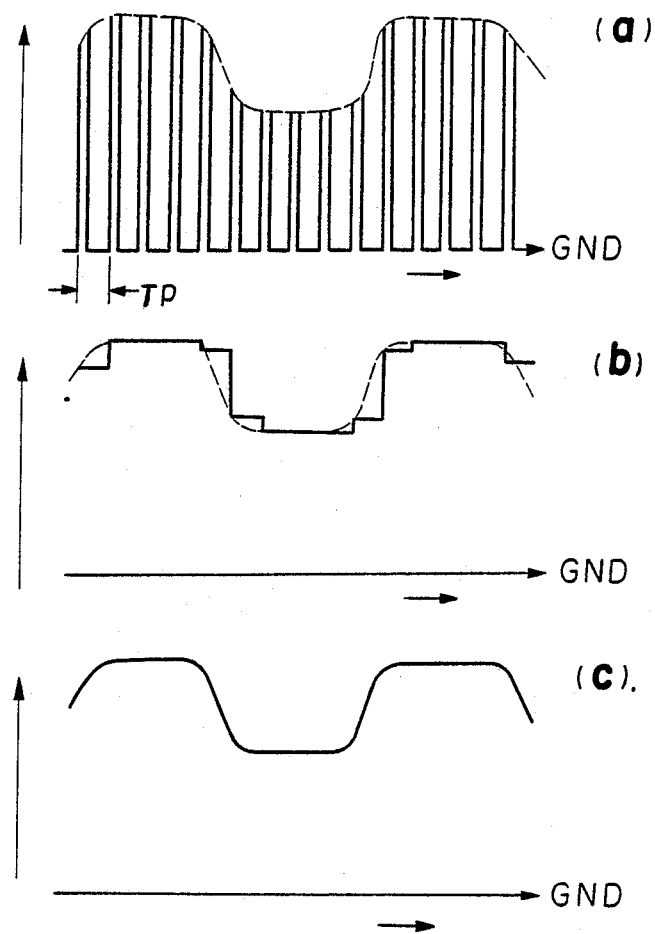
FIGS. 9a to 9c show waveforms in the step of demodulation of electric signals to be reproduced.

FIGS. 9a, 9b and 9c respectively show the waveform of the outputs from the pre-amplifier 52, the sample-hold circuit 53 and the low-pass filter 54. In the Figures, GND refer to ground potential.

Since the laser beam power p of the laser beam source 1 undergoes the primary modulation by the high frequency pulse, the output 55 of the pre-amplifier 52 is in a pulse form having a repetition frequency of fp (fp=1/TP) The laser beam of the pulse form is subjected to the secondary modulation by the data stored on the optical disc, whereby the data taken out from the optical disc is in an envelopeline formed by connecting each peak of the pulsated waveform as shown in FIG. 9a. Namely, the envelopeline of the output 55 of the pre-amplifier 52 shows reproduced data from the optical disc. The envelopeline is sampled by the sample-hold circuit 53 in synchronism with the high frequency pulse, whereby the envelopeline including the recorded data of the optical disc is obtained from the sample-hold circuit 53 by synchronous detection. The output 56 of the sample-hold circuit 53 is a stepwisely changing waveform as shown in FIG. 9b in which high frequency components other than a frequency component of the data to be reproduced. The needless high frequency components are removed by passing the electric signal through the low-pass filter 54. In this case, the cut-off frequency fc of the low-pass filter 54 is determined to be higher than a frequency region of the data to be reproduced and lower than the frequency fp of the driving current I, whereby reproduction signals having amplitudes which change depending on those of the recorded data on the optical disc are outputted from the low-pass filter 54 to the output terminal 58.

The frequency fp of the driving current I may be determined to be two times as the maximum frequency fi of the reproduced data according to the well-known sampling theory. However, if frequency cutting-off characteristics of the low-pass filter 54 in the vicinity of the cut-off frequency fc is not sharp, there may cause distortion in the reproduced signals. Accordingly, it is desirable that some allowance should be given to the frequency fp of the driving current when a simple low-pass filter such as a combination of a resistor amd a capacitor is used. It is desirable from a practical viewpoint that the frequency to be used is in a range of $fp \geq 3fi$.

By providing the construction as mentioned above, the laser beam source is intermittently actuated at a relatively short repeating period (1/fp). Since supply of a driving power to the laser beam source is intermittently stopped, an average driving power required throughout the entire operating time can be remarkably reduced in comparison with the case driven by a direct current, even though the peak value of the power is made large.

On the other hand, reading of the data by the laser beam from the laser beam source is carried out only in the range in which the intensity of the laser beam becomes periodically maximum. Accordingly, the data on the optical disc can be certainly read out in the same manner as in the case that a sufficiently large d.c. driving current is constantly supplied to the laser beam source.

Figure 10:
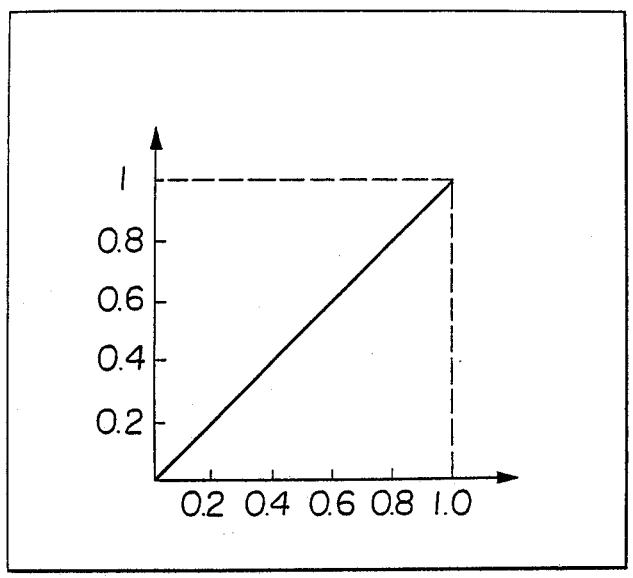
FIG. 10 is a diagram showing reduction of a driving power in the present invention.

FIG. 10 is a diagram showing a relation between variation in a duty $D_R$ of a high frequency pulse current and effect of reducing a driving power for a laser beam source. In this cae, a reduction rate of the driving power is expressed by a ratio of an average consumption power obtained when the laser beam source is actuated by a pulse current from a high frequency power source to an average consumption power obtained when the laser beam source is actuated by a d.c. current from a d.c. power source (a power actuated by a pulse current / a power actuated by d.c. current).

As clear from FIG. 10, when a duty ratio $D_R$ of the pulse current is 0.5, for instance, the average power is only about half in comparison with the case that a d.c. current is continuously supplied. The smaller the duty ratio $D_R$ is, the grater the effect of reducing the driving power is. The duty ratio can be small within a limit of, for instance, the minimal sampling time (settling time) of a sample-hold circuit.

Figure 11:
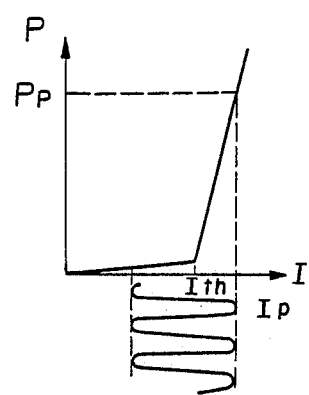
FIG. 11 is a diagram showing another system of driving the laser beam source of the present invention.

With reference to FIG. 11, the driving current I for the laser beam source is not always necessary to change the driving current I in a pulse form values over the entire region from the current zero level to the peak value Ip. The driving current I may be in the range between the peak current value Ip and a current value lower than the threshold value Ith, whereby a power of the laser beam P having an amplitude between substantially zero level portion and the peak level Pp can be obtained. Thus, by controlling the amplitude of the driving current I, a load for the high frequency pulse current generator can be reduced.

Figure 12:
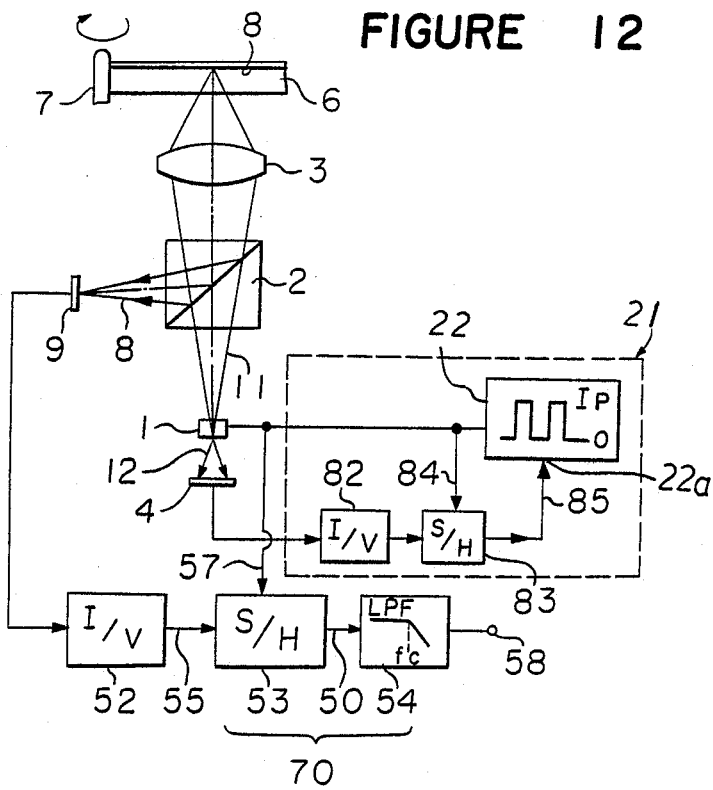
FIG. 12 is a diagram showing a fifth embodiment of the optical type head device according to the present invention.

FIG. 12 is a diagram showing a fifth embodiment of the optical type head device according to the present invention.

The characteristic feature of this embodiment is to provide a current/voltage transducer 82 and a sample-hold circuit 83 in a laser beam source actuating device 90. The current/voltage transducer 82 is connected to the light detector 4 for monitoring the intensity of light 12 which is backwardly emitted from the laser beam source 1, whereby an electric signal having the intensity which changes depending on the laser beam 11 emitted forwardly from the laser beam source 1. The output signal from the transducer 82 is inputted into the sample-hold circuit 83 which performs a sampling operation in synchronism with the frequency of a high frequency pulse current 84 which is given from a high frequency pulse generator 22 to the laser beam source 1. The sampled output signal 85 is fedback to the pulse generator 22. Namely, a negative feedback control loop is constituted by the light detector 4, the current/voltage transducer 82, the sample-hold circuit 83, the pulse generator 22 and the laser beam source 1 to stablize the peak power of the laser beam 11 of the laser beam source 1. Accordingly, a constant peak power of the laser beam is always obtainable even when there is change in temperature and characteristics of the laser beam source 1. For instance, reduction of the lifetime of the laser beam source due to undesired rise of the peak power of the laser beam, or reduction of the reproducing function due to the reduction in the peak power of the laser beam can be avoided.

Figure 13:
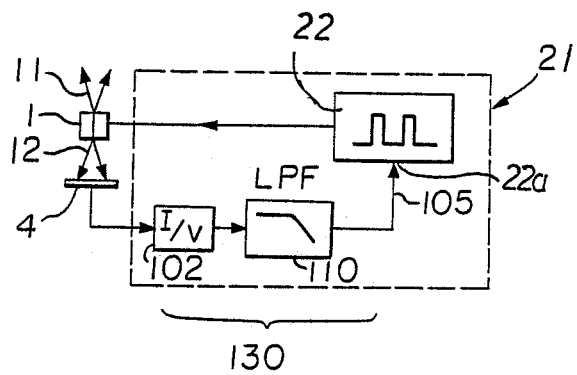
FIG. 13 is a diagram showing a modification of an important part in the optical type head device shown in FIG. 12.
Figure 14:
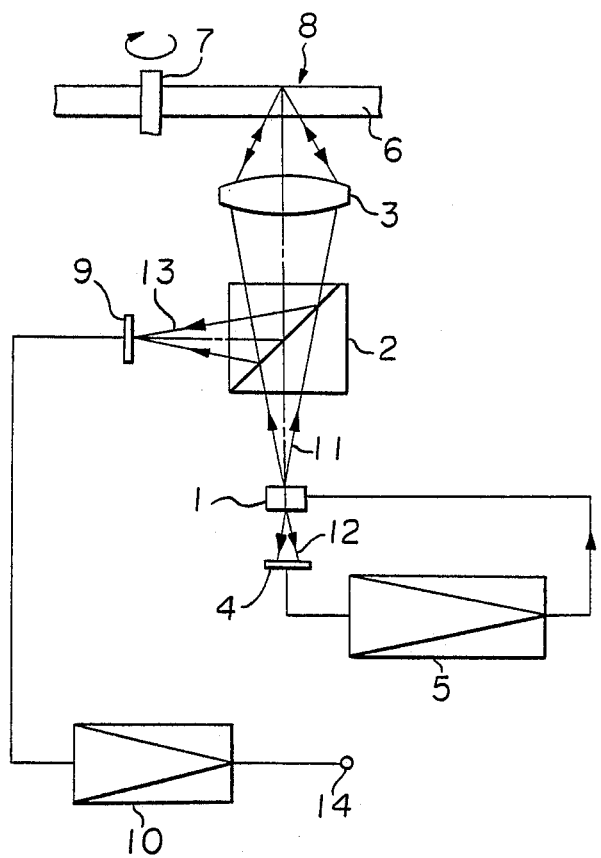
FIG. 14 is a diagram showing a conventional optical type head device.

FIG. 13 is a diagram showing a separate embodiment of the optical type head device in which a negative feedback control loop for stablizing the laser beam 11 of the laser beam source 1 is illustrated.

The negative feedback control loop is so constructed that an output signal for monitoring the intensity of the laser beam produced from the current/voltage transducer 102 is averaged by a low-pass filter 110, and the averaged signal is fedback to a pulse generator 22. In this case, the low-pass filter 110 is so constructed to have a cut-off frequency sufficiently lower than the frequency of a high frequency pulse current for actuating the laser beam source 1, whereby the peak power of the laser beam can be simply stabilized without using a sample-hold circuit.

In the above-mentioned embodiments, a driving current having a sine waveform, a trianglar waveform or a similar waveform may be used instead of the driving current having a rectangular waveform as far as the driving current covers the threshold current Ith region in the I-P characterstics of a laser beam source.

An output having a bi-polarity oscillation voltage may be used instead of a single polarity oscillation voltage. In this case, a current flows only in the forward direction by switching function of the laser beam source. The function is the same.

The present invention is applicable to another useage other than actuation of the laser beam source which is used in an optical head device as mentioned above, for instance, it is applicable to an optical type sensor; which contains laser diode as a light source, so that the driving power of the laser beam source can be reduced.

Obviously, numerous modifications and variations of the present invention are possible in light of the above teachings. It is therefore to be understood that within the scope of the appended claims, the invention may be practiced otherwise than as specifically described herein.

What is claimed is:
1. An optical type head device comprising:
    a laser beam source for emitting a laser beam,
    a light focussing means for converging said laser beam on a data storing surface of an optical type data storing medium,
    a laser beam detecting means which receives said laser beam reflected by said optical type data storing medium and modulated by data held by the same, and converts said data into electric signals, a driving current supplying means for supplying a driving current to said laser beam source, wherein said driving current supplying means comprises a high frequency current generator which supplys to said laser beam source a high frequency current having a waveform ranging from said lower part or said threshold value at which said laser beam source starts emission of said laser beam to the higher part of said threshold value, and the frequency of said high frequency current is at least twice as high as said maximum frequency component of information which is contained in said data storing medium.

2. The optical type head device according to claim 1, wherein a laser beam intensity detecting means is provided to detect the intensity of said laser beam emitted from said laser beam source, and said driving current supplying means produces an intensity signal substantially in proportion to the peak intensity of said emitted laser beam on the basis of the detected signal of said laser beam intensity detecting means to control the amplitude of said high frequency current supplied to said laser beam source on the basis of said intensity signal, whereby the peak intensity of said emitted laser beam is made constant.

3. The optical type head device according to claim 1, wherein a laser beam intensity detecting means is provided to detect the intensity of said laser beam emitted from said laser beam source, and said driving current supplying means produces an average power signal substantially in proportion to the average emission power of said emitted laser beam on the basis of the detected signal of said laser beam intensity detecting means to control the amplitude of the high frequency current supplied to said laser beam source on the basis of said average power signal, whereby the peak intensity of said emitted laser beam is made constant.

4. The optical type head device according to claim 1, wherein said high frequency current has a cyclic waveform varying between zero and the peak value.

5. The optical type head device according to claim 1, wherein the shape of the waveform of the high frequency current is substantially rectangular.

6. The optical type head device according to claim 1, wherein a photoeletric converting means is connected to said laser beam detecting means to output a data reproducing signal on said data storing medium by converting an output current from said laser beam detecting means into a voltage, and the upper limit of an operable frequency band for said photoelectric converting means is so determined that a high frequency component of said driving current to said laser beam source is not mixed with said reproducing signal.

7. The optical type head device according to claim 1, which further comprises a demodulating means to detect data in said electric signal detected by said laser beam detecting means in synchronism with a current signal from a high frequency current generator.

8. The optical type head device according to claim 7, wherein said demodulating means has a sample-holding circuit operating in synchronism with the current signal of said high frequency current generator.

9. The optical type head device according to claim 7, wherein said demodulating means has a filter which cuts a frequency component higher than the maximum frequency in the data to be reproduced.

10. The optical type head device according to claim 7, wherein there is provided a negative feedback control loop which averages for detection the intensity of the signal of the laser beam emitted from said laser beam source so that power to be supplied to said laser beam source is stabilized by said average intensity signal.

11. The optical type head device according to claim 7, wherein a laser beam intensity detecting means is provided to detect the intensity of said laser beam emitted from said laser beam source subjected to a high frequency driving, whereby the amplitude of a high frequency signal to be supplied to said laser beam source is controlled to thereby make the peak intensity of said emitted laser beam constant.

* * * * *

UNITED STATES PATENT AND TRADEMARK OFFICE
CERTIFICATE OF CORRECTION

PATENT NO. : 4811329
DATED : MARCH 7, 1989
INVENTOR(S) : SHINSUKE SHIKAMA, EIICHI TOIDE, and MITSUSHIGE KONDO It is certified that error appears in the above-identified patent and that said Letters Patent is hereby corrected as shown below:

Insert identifying terms in Figures 2, 3, 4, 8, 9, 10 and 15, as shown below and on the attached.

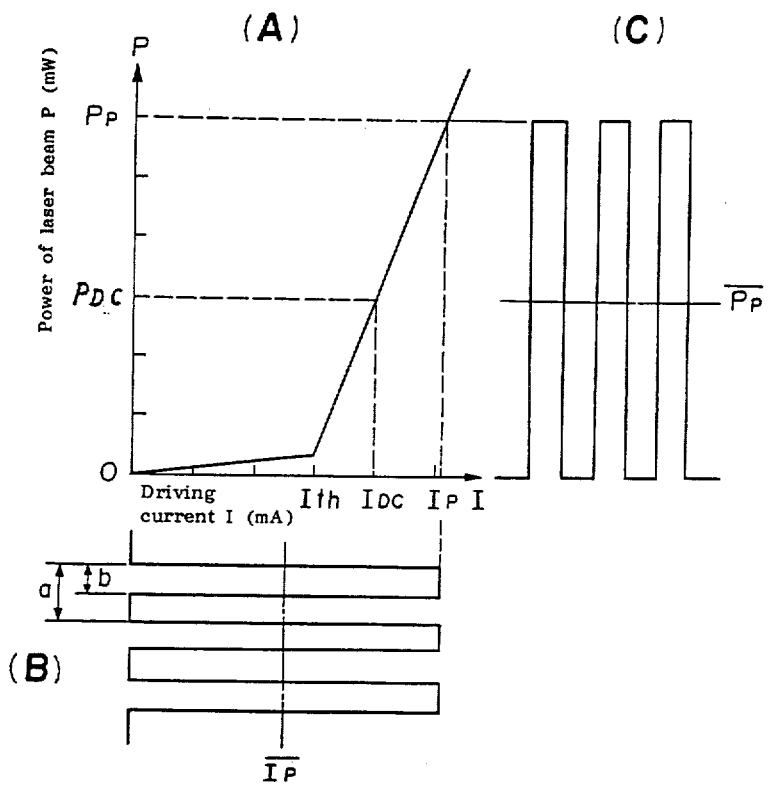

FIGURE 2

UNITED STATES PATENT AND TRADEMARK OFFICE
CERTIFICATE OF CORRECTION

PATENT NO. : 4811329
DATED : MARCH 7, 1989
INVENTOR(S) : SHINSUKE SHIKAMA, EIICHI TOIDE, and MITSUSHIGE KONDO It is certified that error appears in the above-identified patent and that said Letters Patent is hereby corrected as shown below:

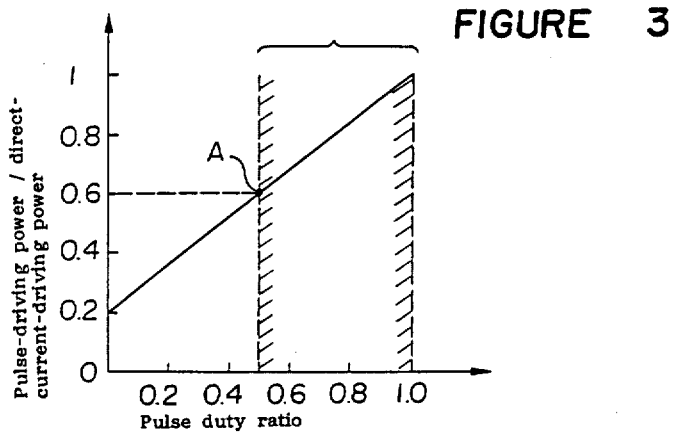

FIGURE 3

UNITED STATES PATENT AND TRADEMARK OFFICE
CERTIFICATE OF CORRECTION

PATENT NO.  : 4811329                     Page 3 of 7
DATED       : MARCH 7, 1989
INVENTOR(S) : SHINSUKE SHIKAMA, EIICHI TOIDE, and MITSUSHIGE KONDO It is certified that error appears in the above-identified patent and that said Letters Patent is hereby corrected as shown below:

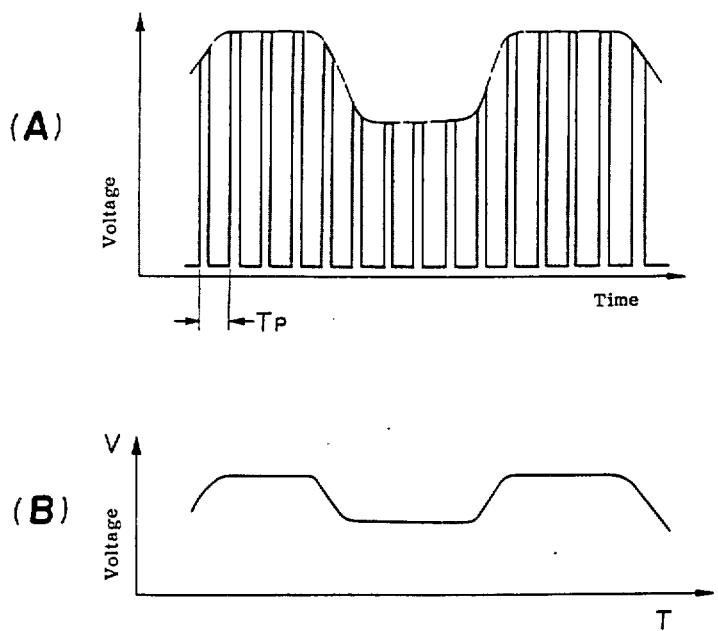

FIGURE 4

UNITED STATES PATENT AND TRADEMARK OFFICE
CERTIFICATE OF CORRECTION

PATENT NO. : 4811329

DATED : MARCH 7, 1989

INVENTOR(S) : SHINSUKE SHIKAMA, EIICHI TOIDE, and MITSUSHIGE KONDO

It is certified that error appears in the above-identified patent and that said Letters Patent is hereby corrected as shown below:

FIGURE 8

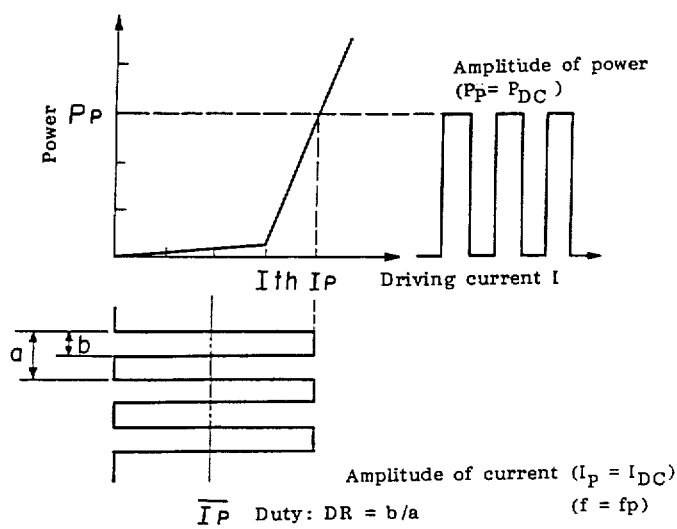

UNITED STATES PATENT AND TRADEMARK OFFICE
CERTIFICATE OF CORRECTION

PATENT NO. : 4811329

DATED : MARCH 7, 1989

INVENTOR(S) : SHINSUKE SHIKAMA, EIICHI TOIDE, and MITSUSHIGE KONDO

It is certified that error appears in the above-identified patent and that said Letters Patent is hereby corrected as shown below:

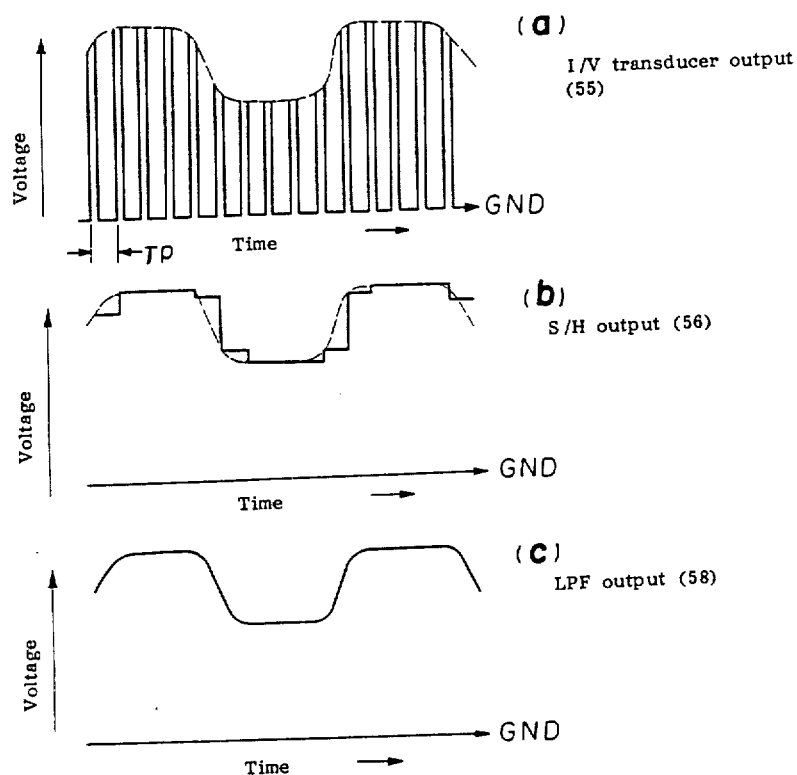

FIGURE 9

UNITED STATES PATENT AND TRADEMARK OFFICE
CERTIFICATE OF CORRECTION

PATENT NO. : 4811329
DATED : MARCH 7, 1989
INVENTOR(S) : SHINSUKE SHIKAMA, EIICHI TOIDE, and MITSUSHIGE KONDO It is certified that error appears in the above-identified patent and that said Letters Patent is hereby corrected as shown below:

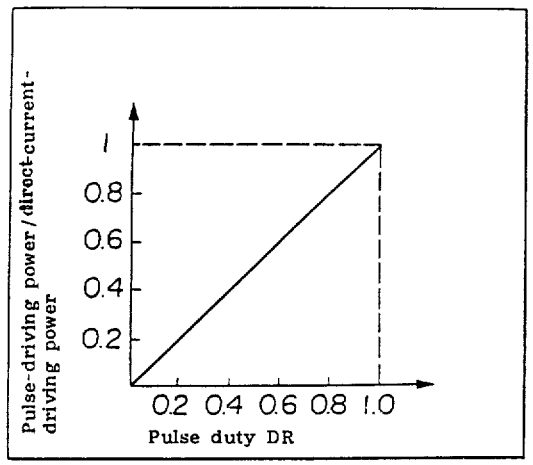

FIGURE 10

UNITED STATES PATENT AND TRADEMARK OFFICE
CERTIFICATE OF CORRECTION

PATENT NO. : 4811329       Page 7 of 7

DATED : MARCH 7, 1989

INVENTOR(S) : SHINSUKE SHIKAMA, EIICHI TOIDE, and MITSUSHIGE KONDO

It is certified that error appears in the above-identified patent and that said Letters Patent is hereby corrected as shown below:

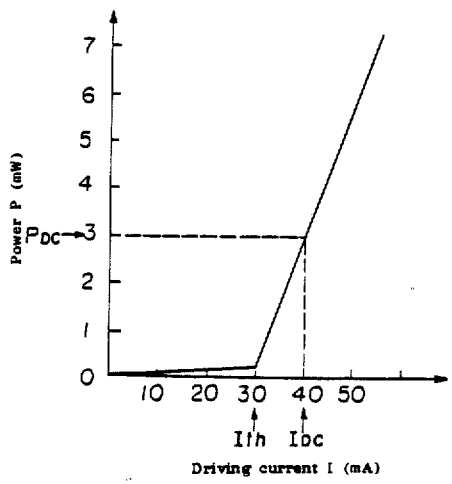

FIGURE 15

Signed and Sealed this

Tenth Day of April, 1990

Attest:

HARRY F. MANBECK, JR.

Attesting Officer     Commissioner of Patents and Trademarks